(12) United States Patent
Zahavi (10) Patent No.: US 9,225,628 B2
(45) Date of Patent: Dec. 29, 2015

(54) TOPOLOGY-BASED CONSOLIDATION OF LINK STATE INFORMATION

(75) Inventor: Eitan Zahavi, Zichron Yaakov (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 912 days.

(21) Appl. No.: 13/114,071

(22) Filed: May 24, 2011

(65) Prior Publication Data

US 2012/0300669 A1    Nov. 29, 2012

(51) Int. Cl.
  H04L 12/28   (2006.01)
  H04L 12/721  (2013.01)
  H04L 12/709  (2013.01)
  H04L 12/933  (2013.01)

(52) U.S. Cl.
  CPC ............ *H04L 45/124* (2013.01); *H04L 45/245* (2013.01); *H04L 49/10* (2013.01); *Y02B 60/33* (2013.01)

(58) Field of Classification Search
  CPC ....... H04L 12/28; H04L 45/124; H04L 49/10; H04L 45/245; Y02B 60/33
  USPC ........................................................ 370/254
  See application file for complete search history.

(56) References Cited

U.S. PATENT DOCUMENTS

| | | | |
|---|---|---|---|
| 5,682,479 A * | 10/1997 | Newhall et al. ................ 709/242 |
| 6,532,211 B1 | 3/2003 | Rathonyi et al. | |
| 6,775,268 B1 | 8/2004 | Wang et al. | |
| 6,804,532 B1 | 10/2004 | Moon et al. | |
| 7,286,535 B2 | 10/2007 | Ishikawa et al. | |
| 7,746,854 B2 | 6/2010 | Ambe et al. | |
| 8,489,718 B1 * | 7/2013 | Brar et al. ...................... 709/222 |
| 2003/0065856 A1 | 4/2003 | Kagan et al. | |
| 2003/0079005 A1 * | 4/2003 | Myers et al. .................. 709/223 |
| 2006/0182034 A1 * | 8/2006 | Klinker et al. ................ 370/238 |
| 2006/0291480 A1 * | 12/2006 | Cho et al. ...................... 370/397 |
| 2007/0058536 A1 | 3/2007 | Vaananen et al. | |
| 2008/0189432 A1 | 8/2008 | Abali et al. | |
| 2009/0119565 A1 | 5/2009 | Park et al. | |
| 2010/0039959 A1 | 2/2010 | Gilmartin | |
| 2010/0284404 A1 | 11/2010 | Gopinath et al. | |
| 2010/0315958 A1 | 12/2010 | Luo et al. | |
| 2011/0085449 A1 * | 4/2011 | Jeyachandran et al. ........ 370/248 |
| 2011/0096668 A1 * | 4/2011 | Bloch et al. ................... 370/237 |
| 2012/0314706 A1 | 12/2012 | Liss | |
| 2013/0114599 A1 | 5/2013 | Arad | |

OTHER PUBLICATIONS

IEEE ISCA2008 "Technology-Driven, Highly-Scalable Dragonfly Topology" by Kim et al. on Jun. 21, 2008.*

(Continued)

*Primary Examiner* — Ayaz Sheikh
*Assistant Examiner* — Hai-Chang Hsiung
(74) *Attorney, Agent, or Firm* — D. Kligler I.P. Services Ltd.

(57) ABSTRACT

A method in a network element that forwards packets to destination nodes includes identifying groups of the destination nodes. Respective performance metrics of multiple different candidate network paths, over which the destination nodes in a given group are reachable from the network element, are estimated jointly for all the destination nodes in the given group. A network path is selected from among the candidate network paths based on the estimated performance metrics. The packets addressed to the destination nodes in the given group are forwarded over the selected network path.

21 Claims, 3 Drawing Sheets

(56) References Cited

OTHER PUBLICATIONS

U.S. Appl. No. 13/481,890, filed May 28, 2012.
U.S. Appl. No. 13/154,458, filed Jun. 7, 2011.
Shah et al., "Direct Data Placement over Reliable Transports", IETF Network Working Group, RFC 5041, Oct. 2007.
Culley et al., "Marker PDU Aligned Framing for TCP Specification", IETF Network Working Group, RFC 5044, Oct. 2007.
Infiniband Trade Association, "InfiniBandTM Architecture Specification vol. 1", Release 1.2.1, Nov. 2007.
U.S. Appl. No. 13/291,143, filed Nov. 8, 2011.
U.S. Appl. No. 12/910,900 Office Action dated Apr. 9, 2013.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Martinez et al., "Supporting fully adaptive routing in Infiniband networks", Proceedings of the International Parallel and Distributed Processing Symposium (IPDPS'03), Nice, France, 10 pages, Apr. 22-26, 2003.
Kagan et al., U.S. Appl. No. 13/481,890, filed May 28, 2012.
Haramaty et al., U.S. Appl. No. 13/754,921, filed Jan. 31, 2013.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM Sigmetrics—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.

\* cited by examiner

TOPOLOGY-BASED CONSOLIDATION OF LINK STATE INFORMATION

FIELD OF THE INVENTION

The present invention relates generally to communication networks, and particularly to methods and systems for management of network state information in network elements.

BACKGROUND OF THE INVENTION

Various topologies are known in the art for connecting network switches to one another in packet networks. Two example topologies are referred to as Fat-Tree and Dragonfly topologies. Fat-Tree networks were originally defined by Leiserson in "Fat-Trees: Universal Networks for Hardware Efficient Supercomputing," IEEE Transactions on Computers, volume C-34, no. 10, 1985, pages 892-901, which is incorporated herein by reference.

Öhring, et al., define extended and generalized Fat Trees, in "On Generalized Fat Trees," Proceedings of the $9^{th}$ International Symposium on Parallel Processing, 1995, page 37, which is incorporated herein by reference. Routing over Fat Tree topologies is addressed, for example, by Zahavi, in "D-Mod-K Routing Providing Non-Blocking Traffic for Shift Permutations on Real Life Fat Trees," CCIT Technical Report #776, Technion—Israel Institute of Technology, Haifa, Israel, August, 2010, which is incorporated herein by reference; and by Yuan et al., in "Oblivious Routing for Fat-Tree Based System Area Networks with Uncertain Traffic Demands," ACM SIGMETRICS Performance Evaluation Review, New York, N.Y., 2007, pages 337-348, which are incorporated herein by reference.

Dragonfly network configurations are addressed, for example, by Matsuoka, in "You Don't Really Need Big Fat Switches Anymore—Almost," Information Processing Society of Japan (IPSJ) Journal, 2008; and by Kim et al., in "Technology-Driven, Highly-Scalable Dragonfly Topology," $35^{th}$ International Symposium on Computer Architecture, 2008, pages 77-78, which are incorporated herein by reference.

Some network elements apply Adaptive Routing (AR) techniques that take into account the current network traffic state. AR in Dragonfly networks is addressed, for example, by Jiang et al., in "Indirect Adaptive Routing on Large Scale Interconnection Networks," ACM SIGARCH Computer Architecture News, New York, N.Y., 2009, pages 220-231, which is incorporated herein by reference. AR in Fat-Tree networks is addressed by Minkenberg et al., in "Adaptive Routing in Data Center Bridges," Proceedings of the 2009 $17^{th}$ IEEE Symposium on High Performance Interconnects, Washington, D.C., 2009, pages 33-41, which is incorporated herein by reference.

SUMMARY OF THE INVENTION

An embodiment of the present invention that is described herein provides a method in a network element that forwards packets to destination nodes. The method includes identifying groups of the destination nodes. Respective performance metrics of multiple different candidate network paths, over which the destination nodes in a given group are reachable from the network element, are estimated jointly for all the destination nodes in the given group. A network path is selected from among the candidate network paths based on the estimated performance metrics. The packets addressed to the destination nodes in the given group are forwarded over the selected network path.

In some embodiments, identifying the groups includes defining each group to contain a respective subset of the destination nodes that are reachable from the network element over a common network path. In an embodiment, estimating the performance metrics includes storing the estimated performance metrics in a data structure having a single respective entry holding the estimated performance metrics for each group. In a disclosed embodiment, the candidate network paths traverse respective different output ports of the network element, and selecting the network path includes selecting one of the output ports for forwarding the packets addressed to the destination nodes in the given group.

In another embodiment, estimating the performance metrics includes estimating respective communication loads of the candidate network paths. In an example embodiment, selecting the network path includes choosing the network path having the lowest communication load. Additionally or alternatively, estimating the performance metrics includes estimating respective latencies of the candidate network paths. In an example embodiment, selecting the network path includes choosing the network path having the lowest latency.

In some embodiments, the network element includes a network switch that is connected to multiple other network switches in a Fat-Tree configuration. In other embodiments, the network element includes a network switch that is connected to multiple other network switches in a Dragonfly configuration.

There is additionally provided, in accordance with an embodiment of the present invention, a network element including multiple ports and circuitry. The ports are configured for forwarding packets to destination nodes. The circuitry is configured to accept an identification of groups of the destination nodes, to estimate, jointly for all the destination nodes in a given group, respective performance metrics of multiple, different candidate network paths over which the destination nodes in the given group are reachable from the network element, to select a network path from among the candidate network paths based on the estimated performance metrics, and to forward the packets addressed to the destination nodes in the given group over the selected network path.

There is also provided, in accordance with an embodiment of the present invention, a computer software product for use in a network element that forwards packets to destination nodes under control of a processor. The product includes a tangible non-transitory computer-readable medium in which program instructions are stored, which instructions, when read by the processor, cause the processor to accept an identification of groups of the destination nodes, to estimate, jointly for all the destination nodes in a given group, respective performance metrics of multiple, different candidate network paths over which the destination nodes in the given group are reachable from the network element, to select a network path from among the candidate network paths based on the estimated performance metrics, and to forward the packets addressed to the destination nodes in the given group over the selected network path.

The present invention will be more fully understood from the following detailed description of the embodiments thereof, taken together with the drawings in which:

DETAILED DESCRIPTION OF EMBODIMENTS

Overview

In various Adaptive Routing (AR) and congestion control schemes, packet routing decisions are made based on estimates of the current network traffic state, for example based on the current load on different network links. When implementing such schemes, a network element (e.g., switch) typically estimates and stores information relating to the current network traffic state, for use in subsequent routing decisions. The memory size, processing power and communication overhead needed for estimating and storing this information, however, may be prohibitive, especially when the network element has a large number of ports and communicates with a large number of network nodes.

Embodiments of the present invention that are described herein provide improved methods and systems for estimating, storing and using network traffic state estimates. These methods and systems take advantage of the fact that, in many network topologies, groups of destination nodes are reachable from a given network element over common sets of network links. For a group of destination nodes that is reachable over a common set of links, it is typically sufficient for the network element to estimate and store the traffic state information for the entire group, rather than for each individual node in the group. (The term "common set of network links" is used in a broad sense, meaning that the network links that connect the different nodes in a given group to the network element have considerable commonality or overlap, but are not necessarily identical.)

Thus, in some embodiments a network element accepts a definition of groups of destination nodes, each group containing nodes that are reachable over a common set of network links. For a given group, the network element estimates performance metrics (e.g., load or latency) of multiple candidate network paths over which the destination nodes in the given group are reachable. (In the present context, the term "network link" refers to a physical connection between network elements or nodes, also sometimes referred to as a hop. The term "network path" refers to a sequence of network links through the network.) The network element typically stores the estimated performance metrics in a Forwarding Database (FDB) that comprises a single entry per group rather than a single entry per destination node.

The stored performance metrics are used by the network element in making packet routing decisions. For a given group of destination nodes, the network element typically selects a network path from among the candidate network paths based on the estimated performance metrics stored for that group, and forwards packets addressed to the destination nodes in the group over the selected network path.

Since the disclosed techniques estimate and store network traffic state information per node group rather than per node, they can achieve considerable reduction in memory space, computational power and communication traffic overhead relative to network elements that estimate and store such information per destination node. The cost of such network elements can therefore be reduced. Moreover, the disclosed techniques enable adaptive routing to be applied in large-scale network elements having large numbers of ports and destination nodes.

The mapping of destination nodes to groups is typically carried out based on the actual topology of the network. This mapping, and the performance improvement achieved by the resulting data consolidation, is demonstrated below for example Fat-Tree and Dragonfly network topologies.

System Description

Figure 1:
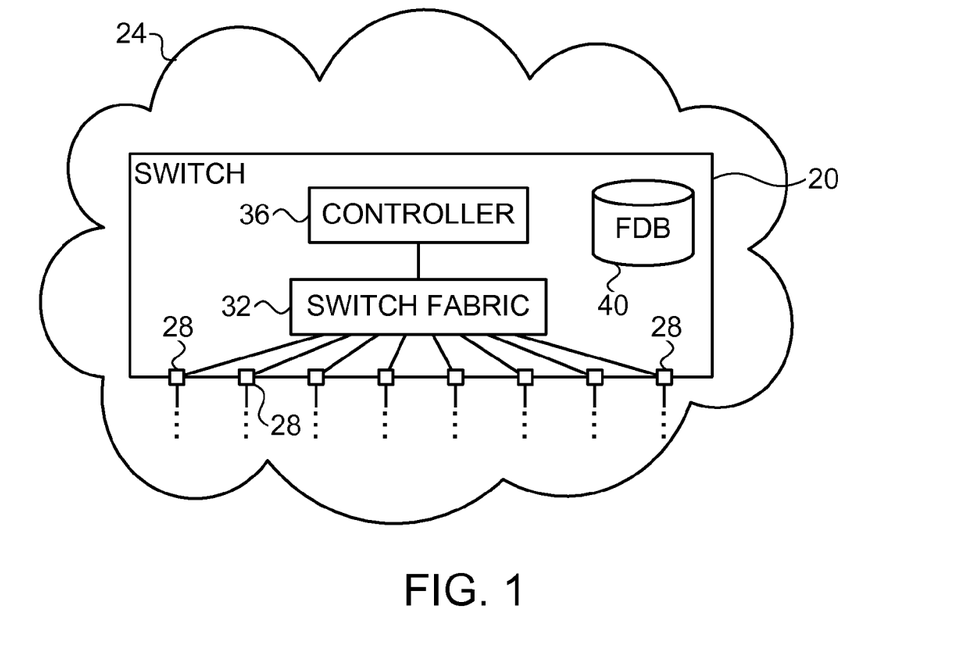
FIG. 1 is a block diagram that schematically illustrates a network switch, in accordance with an embodiment of the present invention.

FIG. 1 is a block diagram that schematically illustrates a network switch 20 in a packet communication network 24, in accordance with an embodiment of the present invention. Network 24 may comprise, for example an Infiniband™ network, an Ethernet™ network or any other suitable type of packet network. Although the embodiments described herein refer to network switches (e.g., Infiniband or Ethernet switches), the disclosed techniques can be used in any other suitable type of network element, such as in routers or bridges.

Figure 4:
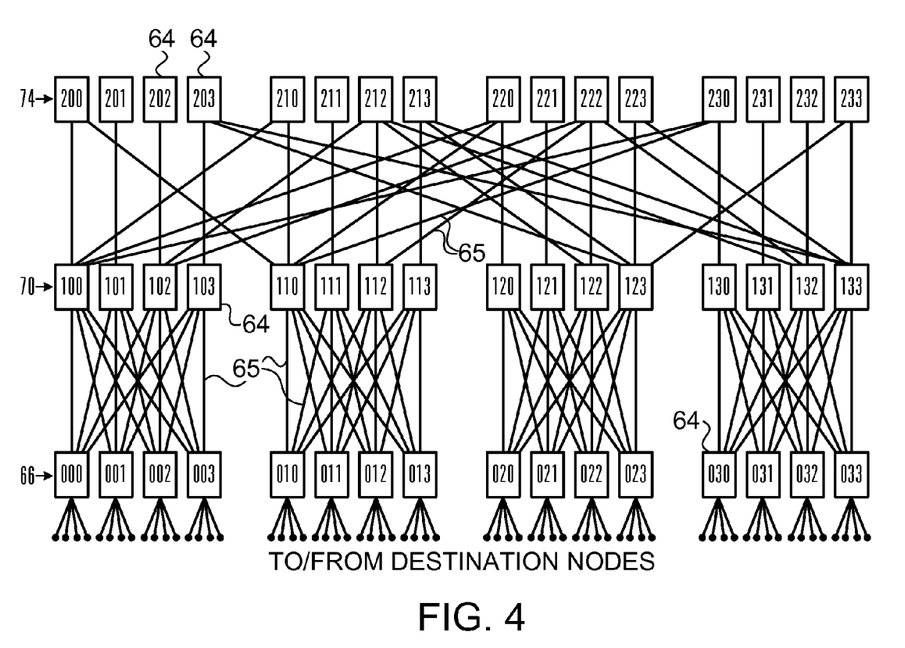
FIG. 4 is a block diagram that schematically illustrates a Fat-Tree network, in accordance with an embodiment of the present invention.
Figure 5:
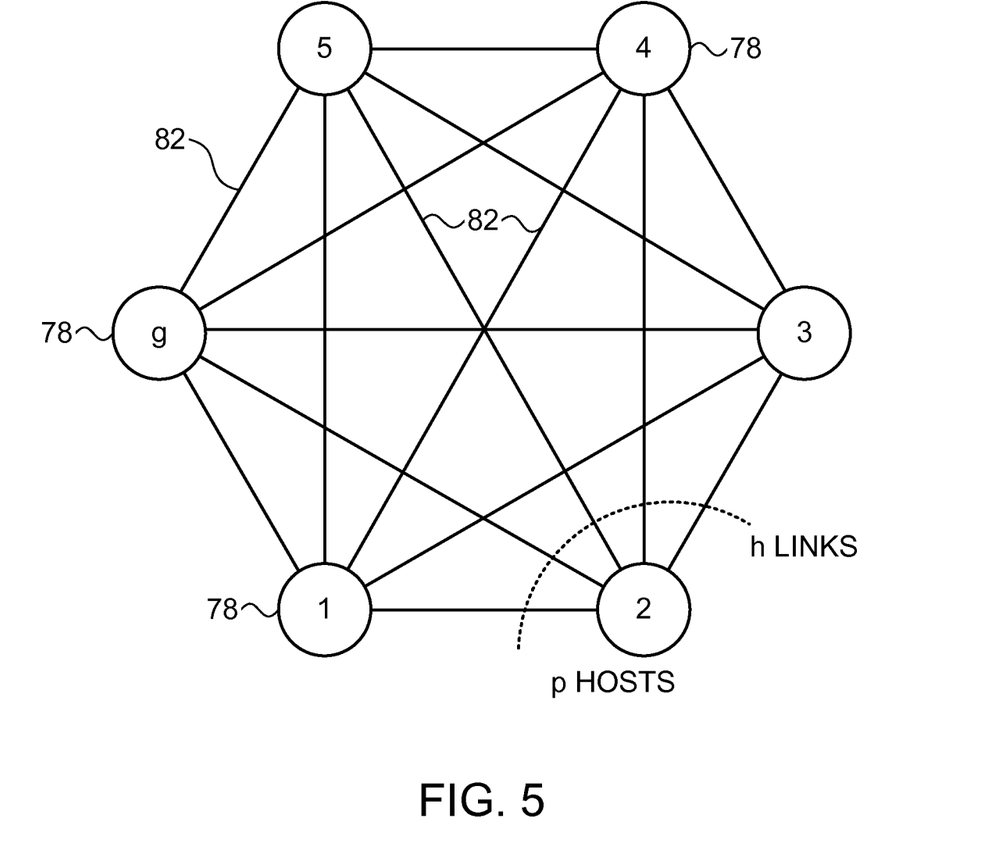
FIG. 5 is a block diagram that schematically illustrates a Dragonfly network, in accordance with an embodiment of the present invention.

Switch 20 comprises multiple ports 28, and circuitry that forwards packets between the ports. In the present example, the circuitry comprises a switch fabric 32, a controller 36 that carries out the methods described herein, and a Forwarding Database (FDB) 40. Ports 28 connect switch 20 to network nodes (typically client computers), to other switches and/or to other network elements (not shown) over network links. Any suitable interconnection topology can be used. Example topologies are shown in FIGS. 4 and 5 below.

Fabric 32 is typically configured by controller 36 to set up suitable forwarding paths between ports 28, such that each ingress packet accepted at a certain port is forwarded to an appropriate port for egress. In the embodiments described herein, each port may serve both as an input port that accepts packets from the network, and as an output port that output packets to the network. The disclosed techniques, however, are not limited to bidirectional ports and can also be used with unidirectional (input-only or output-only) ports.

FDB 40 is typically implemented using a suitable memory, such as Random Access Memory (RAM) or non-volatile memory such as Flash. In an embodiment, FDB 40 holds information that is indicative of the current network traffic state, such as performance metrics of various network paths. This information may be estimated by controller 36 and/or provided from external sources. Controller 36 typically uses this information to configure fabric 32 with the appropriate forwarding paths.

In some embodiments, controller 36 carries out an Adaptive Routing (AR) scheme that selects one of multiple candidate network paths for forwarding packets to a certain destination node, based on the traffic state information stored in FDB 40. The AR scheme typically attempts to balance the communication load over ports 28 and/or to maximize throughput.

As will be described in detail below, controller 36 typically estimates and stores the communication path performance metrics per group of destination nodes rather than per node. The groups are defined based on the commonality between the network links over which their nodes are reachable from switch 20. As a result, the memory size needed for implementing FDB 40 is reduced. The computational power and communication throughput needed for estimating the performance metrics may also be reduced.

The configuration of switch 20 shown in FIG. 1 is an example configuration, which is chosen purely for the sake of conceptual clarity. In alternative embodiments, any other suitable switch configuration can also be used. The elements of switch 20 can be implemented using hardware, e.g., using one or more Application-Specific Integrated Circuits (ASICs) or Field-Programmable Gate Arrays (FPGAs). Alternatively, some elements of switch 20 may be implemented in software, or using a combination of hardware and software elements.

Typically, controller 36 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Storing Path Performance Metrics Per Destination Group

In many network topologies, it is possible to identify groups of destination nodes that are reachable from switch 20 via a common set of network links. When this condition is met, it is typically sufficient to estimate and store the network traffic state (e.g., performance metrics of network paths) for the entire group jointly, and not for each individual destination node.

Consider, for example, an embodiment in which switch 20 carries out an AR scheme that examines multiple candidate network paths for routing packets from switch 20 to each destination node. Each destination node may be reachable from switch 20 via two or more candidate network paths, each path traversing a respective different port 28. For a given destination node, controller 36 estimates performance metrics for the various candidate paths, and selects the path having the best performance.

When the destination nodes can be assigned to groups as described above, a common set of performance metrics will typically apply to all the destination nodes in a given group. Thus, in some embodiments controller 36 estimates and stores the performance metrics jointly for all the nodes in a given group, and not for each individual destination node. Since the network paths from switch 20 to the nodes in a given group have large commonality, this data consolidation will typically cause little or no degradation in the quality of the routing decisions.

Controller 36 may estimate and store in FDB 40 various types of performance metrics for the candidate network paths. In one embodiment, the performance metric of a network path comprises the local load on the port 28 that this path traverses. In another embodiment, the performance metric comprises a global load that considers the load on the various network links along the path. In still another embodiment, the performance metric comprises a global latency that considers the latency on the various network links along the path. In some embodiments, controller 36 may use a combination of two or more types of metrics. Further alternatively, controller 36 may estimate, store and use any other suitable type of performance metrics for the candidate network paths.

Typically, local metrics (loads or latencies of ports 28) are simpler to estimate locally by controller 36 than global metrics, but are less indicative of the overall suitability of the path in question, and vice versa. Global performance metrics are addressed, for example, in the papers by Jiang et al. and Minkenberg et al., cited above.

Figure 2:
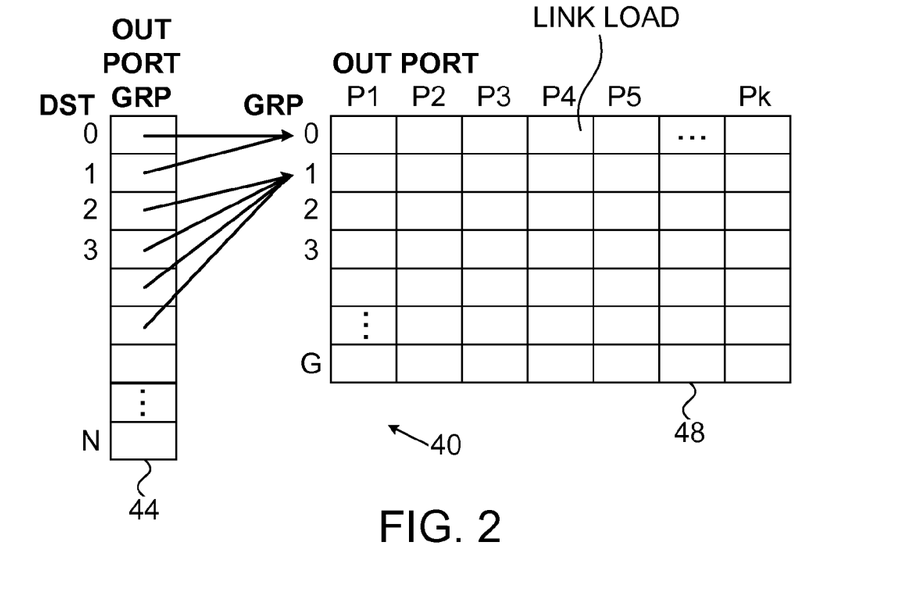
FIG. 2 is a diagram that schematically illustrates a Forwarding Database (FDB) in a network switch, in accordance with an embodiment of the present invention.

FIG. 2 is a diagram that schematically illustrates an example configuration of FDB 40, in accordance with an embodiment of the present invention. In this example, switch 20 comprises k output ports denoted P1 . . . Pk, and communicates with N+1 destination nodes denoted 0 . . . N. The destination nodes are divided into G+1 groups denoted 0 . . . G. The performance metrics in this case comprise global path loads.

In this embodiment, FDB 40 comprises a mapping table and a metric table 48. Mapping table 44 maps destination nodes to groups. In other words, the $i^{th}$ entry in table 44 specifies the group to which the $i^{th}$ destination node belongs. Metric table 48 comprises a respective entry per group, which holds the performance metrics of this group.

In the present example, the $j^{th}$ row of table 48 holds k global path load values, one for each output port. Each load value indicates the load on the network path from switch 20 to the $j^{th}$ group via the corresponding output port.

Assuming each load value (each entry in table 48) is represented using L bits, the number of output ports is K, the number of destination nodes is N+1 and the number of groups is G+1, the number of bits that would be needed for storing the load values (without using the disclosed technique) is (N+1)·L·P. When using the disclosed techniques, the number of bits is reduced to (N+1)·Log$_2$(G+1)+(G+1)·L·P. Thus, memory space is reduced by a factor of ~N/G.

In an example embodiment, consider a fat-tree network having N=11,664 nodes that is implemented using 36-port switches. In such a topology, there are P=18 different up-going ports that a path to a given destination may follow. Without using the disclosed technique, a traffic state table holding 8 bits of information per destination will consume N·L·P=11,664·8·18=1,679,616 bits. When using the disclosed technique, nodes are grouped (with highest precision) by the switch they connect to, and therefore G=324. The size of table 44 in this case is N Log$_2$(G)=104,976 bits, and the size of table 48 is GLP=324·8·18=46, 656 bits. The disclosed technique in this case saves 1−(104,976+46,656)/1,679, 616=91% of the hardware cost. The above values are given purely by way of example, in order to demonstrate the effectiveness of the disclosed techniques. In alternative embodiments, any other suitable values can be used.

In order to re-configure the forwarding path (in fabric 32) for the packets destined to a certain destination path, controller 36 looks-up table 44 to obtain the group to which this destination node belongs. Then, controller 36 looks-up the row that corresponds to this group in table 48. Controller 36 finds the lowest load value in this row, and selects the output port having this load value. Controller 36 configures fabric 32 to forward the packets destined to the destination node in question via the selected output port.

Typically, controller 36 configures a forwarding path in fabric 32 per packet flow. In some embodiments, controller 36 makes AR decisions in a two-step process. First, the controller decides whether the forwarding path of a certain packet flow is to be re-configured or not. Once the forwarding path of a certain flow is to be re-configured, controller 36 attempts to find a better forwarding path using the above-described scheme.

By using the disclosed technique, the number of rows in table 48 corresponds to the number of groups (G+1) and not to the number of destination nodes (N+1). Since typically G<<N, the disclosed techniques reduce the required memory size considerably. Computational complexity and communication overhead are similarly reduced.

Figure 3:
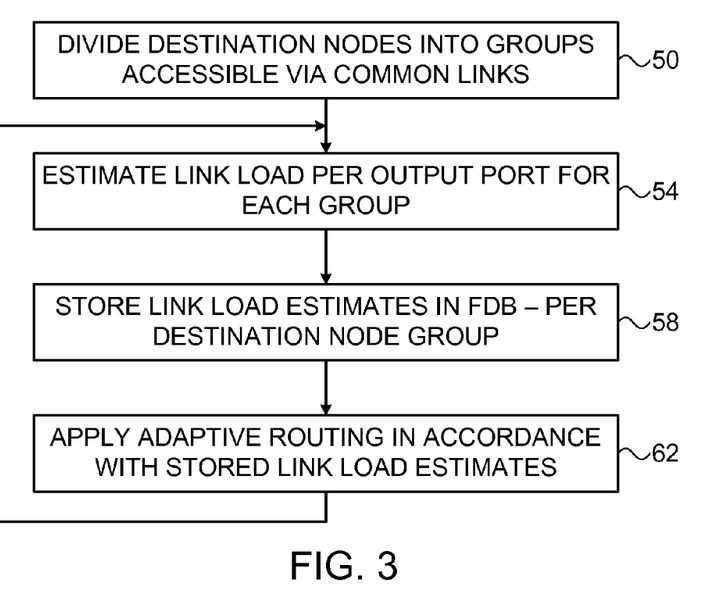
FIG. 3 is a flow chart that schematically illustrates a method for packet forwarding, in accordance with an embodiment of the present invention.

FIG. 3 is a flow chart that schematically illustrates a method for packet forwarding, in accordance with an embodiment of the present invention. The method begins with dividing the destination nodes that are reachable by switch 20 into groups, at a grouping step 50. This grouping is typically performed a-priori based on the network topology. The definition of the groups (i.e., a definition of the destination nodes belonging to each group) is provided to controller 36 in switch 20.

For each group, controller 36 estimates the performance metrics of the various candidate network paths from switch 20 to the group, at a metric estimation step 54. In the present example, for each output port 28, controller 36 estimates the global path load of the path traversing this output port en-route to the group of destination nodes. In some embodiments, controller 36 estimates the performance metrics based on information that it receives from other network elements.

Controller 36 stores the estimated performance metrics in FDB 40, per group, at a storage step 58. In the present example, controller 36 maintains a dual-table FDB as shown in FIG. 2 above. Controller 36 applies AR to incoming packet flows based on the path performance metrics stored in FDB 40, at an adaptive routing step 62.

Network Topology Examples

The disclosed techniques can be used with any suitable network topology. The following description addresses two example topologies, namely Fat-Tree and Dragonfly topologies.

In some embodiments, network 24 comprises a Fat-Tree network, i.e., switch 20 is connected to the nodes and to other switches in the networks in a Fat-Tree topology. In a Fat-Tree network, network nodes are connected to leaf switches at the edge of the network, and the leaf switches are interconnected by links to spine switches arranged in multiple hierarchical levels inside the network. The numbers of spine switches and links at each level are chosen so as to provide sufficient bandwidth between the spine switches to enable multiple nodes (or all of the nodes) to exchange messages via the network concurrently.

The term "Fat-Tree" is used broadly in the art to define any and all types of communication networks meeting the above criteria and includes extended and generalized types of Fat Trees, as described, for example, in the papers by Öhring, et al., and Zehavi, cited above.

FIG. 4 is a block diagram that schematically illustrates a Fat-Tree network, in accordance with an embodiment of the present invention. The network of FIG. 4 is a recursively-defined Extended Generalized Fat Tree (XGFT), as defined in the paper by Öhring, et al., cited above. The example network of FIG. 4 shows a XGFT(3; 4,4,4; 4,4,1) topology, where some of the top level links have been omitted for the sake of clarity. The network comprises switches 64 that are connected by network links 65 and arranged in three levels denoted 66, 70 and 74. The switches in level 66 are referred to as leaf switches, and they are connected to the destination nodes. The switches in levels 70 and 74 are referred to as spine switches.

XGFT networks have the following properties, which make them attractive for implementing the disclosed techniques:

In the downward direction (from the spine switches toward the leaf switches) each port of a given switch connects to a different sub-tree which is totally disjoint from all the other sub-trees reachable through the other down-going ports of that switch. Therefore, each down-going port in a given switch accesses a different set of nodes.

In the upward direction (from the leaf switches toward the spine switches) each up-going port of a given switch connects to a different switch. For a given switch, all nodes except the ones belonging to the switch's own sub-tree are reachable through any of the up-going ports.

The performance of the disclosed techniques in Fat-Tree topologies will now be demonstrated for 2-level and 3-level XGFT networks. For a 2-level XGFT of the form XGFT(2; m2,m1; w2,w1) there are w2 spine switches, each with m2 sub-trees of m1 processing nodes. Thus, we can write $N=w2 \cdot m2 \cdot m1$. Switches at the spine level (level=2) do not have any choice for routing to a destination node, since the destination node is reachable only via one of the down-going ports. For leaf switches (at level=1) there are m1 directly attached destination nodes. To reach the other destination nodes the data may be sent through any of the spine switches and then to the correct leaf switch. In an embodiment, the number of groups is the number of leaf switches (since once the leaf switch is reached the exact destination node does not matter). Therefore, $G=w2 \cdot m2$.

For a 3-level Fat-Tree, a distinction should be made between switches at the three different levels. The spine switches at level 3 do not have any choice for routing to a destination node because the destination node is reachable through only one of the down-going ports. Level-2 switches have $w1 \cdot m1$ destination nodes that are reachable through the down-going links. The remaining destination nodes are reachable through all the up-going ports connected to the different spine switches. In the downward direction, the destination nodes may be grouped by their leaf switch. Level-1 switches have only m1 local destination nodes. The other destination nodes may be split into groups of m1 destinations too.

For 3-level Fat-Tree of the form XGFT(3; m3,m2,m1; w3,w2,w1), the total number of destination nodes is $N=w3 \cdot m3 \cdot w2 \cdot m2 \cdot m1$. The number of destination groups for a given switch is $N/m1$. With some loss of accuracy, it is possible to calculate an average link level load for all destination nodes reachable through a middle switch, and the number of groups can be further reduced to $N/m1 \cdot m2$.

In alternative embodiments, network 24 comprises a Dragonfly network, i.e., switch 20 is connected to the nodes and to other switches in the networks in a Dragonfly topology.

FIG. 5 is a block diagram that schematically illustrates a Dragonfly network, in accordance with an embodiment of the present invention. A Dragonfly topology is constructed in two levels: In the first level, a group of interconnected switches forms a virtual high-port-count (radix) switch. This switch is referred to as a Group and denoted 78 in the figure. In the second level, g such groups are connected to one another in a full graph topology. Every group is connected to p network nodes (by a single link each) and by m parallel links 82 to each of the other g−1 groups. Since in most cases p>m in order to support traffic states where all the nodes of one group send traffic to the nodes of another group, it is typically required that some of the traffic is sent on non-minimal paths (since there are only m links between each pair of groups). The term "non-minimal path" between two groups means a path that traverses at least one additional intervening group.

In a Dragonfly network it is typically assumed that the virtual switch (group) has sufficient resources to route the local traffic and pass-through traffic (of non minimal paths) with no contention. Using the minimal path is advantageous in terms of latency, and also because non-minimal path traffic uses at least two group-to-group links. To reduce the usage of non-minimal routes and to avoid congestion at the second traversed global link, AR schemes for Dragonfly topologies typically utilize global link load information, which is assumed to be available in each of the switches of the group.

Dragonfly networks have the following properties:

Each global link, whether used by minimal-hop routing or as the second hop in non-minimal routing, provides access to the p processing elements of the group it connects to.

Each global link, if used as the first hop of a non-minimal route, provides access to all groups.

From the point of view of a switch located within a virtual switch group, there are g−1 groups of remote virtual switch destinations. Local destinations may also require splitting into several destination groups, depending on how the local virtual switch is defined. No more than p groups are possible (one per destination). Therefore, for Dragonfly topology $N=p \cdot g$ and $G=p+g$.

Although the embodiments described herein mainly address Adaptive Routing in Fat-tree and DragonFly topologies, the methods and systems described herein can also be used in other applications, such as in various other network topologies, and when traffic state is to be stored on each of the network switches.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a network element that forwards packets to destination nodes, identifying a plurality of groups of the destination nodes, each group containing destination nodes that are reachable from the network element over a common set of multiple candidate network paths and respective candidate ports of the network element;

determining performance values for links of the network, maintaining a table with a plurality of entries, the table including an entry for each given group of the destination nodes, each entry including a plurality of performance metrics, such that each entry includes a current respective performance metric for each of the candidate ports of the network element over which the destination nodes in the given group are reachable from the network element;

receiving a packet at the network element;

determining a destination node of the received packet;

determining, by the network element, a group to which the determined destination node belongs;

selecting a port from among the candidate ports based on the performance metrics for the group of the destination of the packet, in the table; and forwarding the received packets through the selected port, wherein the respective performance metric comprises a global load or latency value dependent on performance values of a plurality of links along a path to the destination nodes of the group, and wherein each respective performance metric of a destination group and a candidate port of the network element is calculated from a plurality of performance values of links along a path to the destination nodes of the group through the candidate port.

2. The method according to claim 1, wherein the table has a single respective entry holding the performance metrics for each group.

3. The method according to claim 1, wherein the performance metrics comprise respective communication loads of the candidate network paths.

4. The method according to claim 3, wherein selecting the port comprises choosing the network path having the lowest communication load.

5. The method according to claim 1, wherein the performance metrics comprise respective latencies of the candidate network paths.

6. The method according to claim 5, wherein selecting the port comprises choosing the network path having the lowest latency.

7. The method according to claim 1, wherein the network element comprises a network switch that is connected to multiple other network switches in a Fat-Tree configuration.

8. The method according to claim 1, wherein the network element comprises a network switch that is connected to multiple other network switches in a Dragonfly configuration.

9. The method according to claim 1, wherein the number of entries in the table corresponds to the number of groups and is substantially smaller than the number of nodes in the network.

10. The method according to claim 1, wherein maintaining the table comprises estimating the current respective performance metrics based on information received from other network elements.

11. The method according to claim 1, wherein the respective performance metric comprises a global load dependent on load values of a plurality of links along a path to the destination nodes of the group.

12. The method according to claim 1, wherein the respective performance metric comprises a global latency dependent on latency values of a plurality of links along a path to the destination nodes of the group.

13. A network element, comprising:

multiple ports for forwarding packets to destination nodes; and circuitry, which is configured to accept an identification of groups of the destination nodes, each group containing destination nodes that are reachable from the network element over a common set of multiple candidate network paths through respective ones of the multiple ports, to maintain a table with a plurality of entries, the table including an entry for each given group of the destination nodes, each entry including a plurality of performance metrics, such that each entry includes a current respective performance metric for each of the candidate ports through which the destination nodes in the given group are reachable from the network element, to receive a packet, to determine a destination node of the received packet, determine a group to which the determined destination node belongs, to select a port from among the candidate ports based on the performance metrics for the group of the destination of the packet, in the table, and to forward the packets addressed to the destination nodes in the given group through the selected port, wherein the respective performance metric comprises a global load or latency value dependent on performance values of a plurality of links along a path to the destination nodes of the group, and wherein each respective performance metric of a destination group and a candidate port of the network element is calculated from a plurality of performance values of links along a path to the destination nodes of the group through the candidate port.

14. The network element according to claim 13, and comprising a memory, wherein the circuitry is configured to store the table and wherein the table has a single respective entry holding the performance metrics for each group.

15. The network element according to claim 13, wherein the circuitry is configured to estimate the performance metrics by estimating respective communication loads on the candidate network paths.

16. The network element according to claim 15, wherein the circuitry is configured to select the port by choosing the network path having the lowest communication load.

17. The network element according to claim 13, wherein the circuitry is configured to estimate the performance metrics by estimating respective latencies on the candidate network paths.

18. The network element according to claim 17, wherein the circuitry is configured to select the port by choosing the network path having the lowest latency.

19. The network element according to claim 13, wherein the network element comprises a network switch that is connected to multiple other network switches in a Fat-Tree configuration.

20. The network element according to claim 11, wherein the network element comprises a network switch that is connected to multiple other network switches in a Dragonfly configuration.

21. A computer software product for use in a network element that forwards packets to destination nodes under control of a processor, the product comprising a tangible non-transitory computer-readable medium in which program instructions are stored, which instructions, when read by the processor, cause the processor to accept an identification of groups of the destination nodes, each group containing destination nodes that are reachable from the network element over a common set of multiple candidate network paths through respective ones of the multiple ports, to maintain a table with a plurality of entries, the table including an entry for each given group of the destination nodes, each entry including a plurality of performance metrics, such that each entry includes a current respective performance metric for each of the candidate ports through which the destination nodes in the given group are reachable from the network element, to receive a packet, to determine a destination node of the received packet, determine a group to which the determined destination node belongs, to select a port from among the candidate ports based on the performance metrics for the group of the destination of the packet, in the table, and to forward the packets addressed to the destination nodes in the given group through the selected port, wherein the respective performance metric comprises a global load or latency value dependent on performance values of a plurality of links along a path to the destination nodes of the group, and wherein each respective performance metric of a destination group and a candidate port of the network element is calculated from a plurality of performance values of links along a path to the destination nodes of the group through the candidate port.

* * * * *